Nov. 14, 1961     F. WEISS     3,008,990
METHOD OF EXTRACTING ACRYLAMIDE FROM ITS REACTION MEDIUM
Filed March 28, 1960
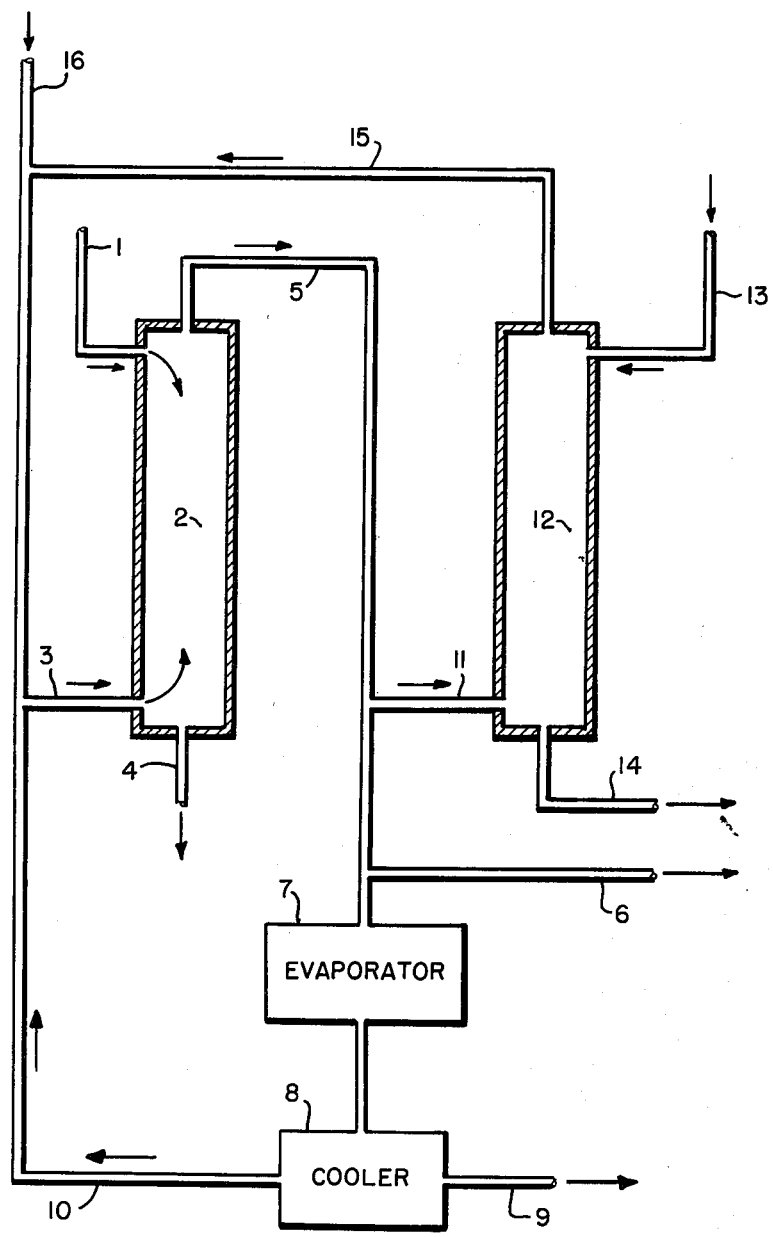
INVENTOR.
*Francis Weiss*
BY
*HIS ATTORNEYS*

United States Patent Office 3,008,990
Patented Nov. 14, 1961

3,008,990
METHOD OF EXTRACTING ACRYLAMIDE FROM ITS REACTION MEDIUM
Francis Weiss, Pierre-Benite, France, assignor to Societe d'Electro-Chimie d'Electro-Metallurgie et des Acieries Electriques d'Ugine, Paris, France, a corporation of France
Filed Mar. 28, 1960, Ser. No. 18,065
Claims priority, application France Apr. 1, 1959
6 Claims. (Cl. 260—561)

The present invention relates to a process for extracting monomer acrylamide from the products contained with it in the solutions resulting from sulphuric acid hydrolysis of acrylonitrile.

The method consisting in hydrating acrylonitrile by action of a sufficient amount of sulphuric acid, generally having a concentration of 75 to 90%, is well known and results in a reaction mixture containing the greatest part of the acrylonitrile as acrylamide and the sulphuric acid in excess.

Extracting acrylamide from such mixture involves difficult problems and many solutions have been proposed to solve them.

Effectively, it is not possible, as in the case of other aliphatic amides slightly soluble or insoluble in water, to separate acrylamide from sulphuric acid by mere dilution with water because of its high solubility in water (about 140 g. acrylamide per 100 g. water at 20° C.).

Nevertheless, it has been proposed to neutralize the reaction mixture with lime, filter the insoluble calcium sulphate and concentrate the mother water to separate acrylamide therefrom by crystallization. The main difficulty of this method consists in the fact that to remove the adsorbed acrylamide from the cake of calcium sulphate the cake must be thoroughly washed, which results in solutions which are very dilute and increases the cost of concentration and the risk of polymerization during concentration.

It has also been suggested to carry out the neutralization in a solvent, for instance isopropanol, with gaseous ammonia or any other base giving a sulphate insoluble in the solvent. Then it suffices to filter and concentrate the mother solution of acrylamide. This process meets to some extent with the same disadvantages as the previous one. Besides, neutralizing in a non-aqueous medium is always long and difficult; it generally requires an excess of base which, particularly in the case of ammonia, leads to the formation of addition by-products with acrylamide.

Another proposed variant consists in dissolving the mixture of acrylamide and sulphuric acid in water and in bringing this solution into contact with an ion exchange resin. The acrylamide is preferentially retained and may be recovered by water washing of the resin. But the immobilization of large quantities of these costly special resins and the handling expenses of the superdiluted solutions obtained render this process rather onerous.

At last, it has recently been proposed to neutralize the sulphuric acid in excess by ammonia so that the acrylamide-ammonium sulphate-water mixture obtained is in the heterogeneous area of the solubility ternary diagram. Under suitably chosen operating conditions, ammonium sulphate separates almost completely in the crystallized state and, after this separation, it is possible to obtain crystallized acrylamide, poor in ammonium sulphate, by cooling the mother waters. This process seems rather simple, but the obtention of satisfactory results depends upon the observance of delicate and strict operating conditions.

Thus it is necessary to maintain a pH near 7 so as to avoid secondary reactions of hydrolysis or addition on the double linking. This is all the more difficult to realize as the reacting agents are highly concentrated (anhydrous ammonia, aqueous soda at more than 50% concentration, etc.) and the reaction medium formed is a thick slurry of crystals. In practice, a substantial quantity of mother waters saturated in acrylamide must be recycled so as to fluidify the slurry, facilitate the neutralization and dissipate the heat evolved by said neutralization, but thus the risks of incidental polymerization during the production are increased.

The present invention avoids most of these disadvantages. It concerns a method of extracting acrylamide from the solutions resulting from the hydrolysis of acrylonitrile in a sulphuric acid medium, which comprises neutralizing the acidic solution from this hydrolysis in order to obtain a homogeneous, aqueous solution free from precipitated salts and then treating said solution continuously or discontinuously with an organic solvent of acrylamide which is as little soluble as possible in water and in aqueous solutions of alkali or ammonia sulphates.

The drawing is a flow diagram illustrating one way of practicing the method.

The applicant has discovered that acrylamide, although highly soluble in water and slightly soluble in the usual organic solvents, may be preferentially dissolved in certain solvents when the aqueous acrylamide solution is rich in mineral salts, sulphates for instance. On the contrary, when it contains no salts, acrylamide remains mostly in the aqueous phase. Thus, when 65 g. methylisobutylketone are agitated, at 25° C. for instance, with 100 g. of an aqueous solution containing 13 g. acrylamide and 35 g. ammonium sulphate, 9.7 g. of acrylamide are extracted, that is 75% of the initial amount. On the contrary, when 100 g. of an aqueous solution containing 29 g. acrylamide, but no ammonium sulphate, are agitated with 70 g. methyl-isobutylketone, the solvent extracts only 4.7 g. of acrylamide, that is 16.2% of the initial amount.

Besides, applicant has also observed that the solubility of acrylamide in some organic solvents increases considerably when the solvent is saturated with water. So the solubility of acrylamide at 20° C. is 26 g. in 100 g. anhydrous methylethylketone and 75 g. in 100 g. azeotrope methylethylketone-water (88.7% by weight of methylethylketone and 11.3% water). Likewise, the solubility of acrylamide changes from 6.3% by weight in anhydrous methylisobutylketone to about 15% in methylisobutylketone saturated with water.

In consequence, it will be preferable to choose as extracting solvents those in which water is slightly soluble so as to benefit by the increased solubility of the acrylamide resulting from the water saturation of the solvent. As an indication, the water absorbed by the chosen solvent will be comprised between 0.5 and 20 g. wa'er per 100 g. solution, when the solvent and water are in contact and are mutually saturated.

Moreover, the solvent must be as little soluble as possible in water and in the saline solutions so as to avoid the losses of solvent by dissolution in the aqueous phase and a costly recovery by distillation of these solutions.

Although it is possible to cause the saturation of the solvent with water before using it in the process, this is not absolutely necessary, for the solvent saturates by itself with water when in contact with the acrylamide aqueous solution and also extracts said acrylamide.

The solvents fufilling the mentioned conditions belong to most various classes: alcohols, esters, ketones, etc. The solvents presenting the best characteristics and also having the advantage of being usual and cheap solvents are n-butanol, ethyl acetate, methylethylketone and methylisobutylketone. In this group, methylisobutylketone, which is far less soluble in water than the other solvents and almost insoluble in the aqueous solutions of alkali or ammonium sulphates, will be preferred.

The neutralization of the free sulphuric acid contained in the mixture resulting from the sulphuric acid hydrolysis of acrylonitrile may be carried out with any neutralizing reagent resulting in a sulphate which is soluble in water. Thus, it is possible to use ammonia, caustic soda, sodium carbonate, caustic potash or potassium carbonate. The neutralization is preferably carried out by simultaneous addition of both reagents into a tank containing some quantity of a neutral solution, in order to maintain a pH between 3 and 8. However, this manner of operating is not imperative. It is quite possible to add one reagent to the aqueous solution of the other.

The neutralization may be performed at any temperature but preferably not above 60° C. It is quite possible to operate at low temperature, for instance at 0° C., so as to prevent secondary reactions; it suffices to take care that the dilution is sufficient to avoid formation of crystals.

The concentration of reagents is determined so that once the neutralization is accomplished the obtained solution remains homogeneous. It is advantageous but not indispensable that the concentration of acrylamide in the solution be at a maximum.

The solvent extraction treatment may be carried out in several ways. It may be carried out either discontinuously by extracting the acrylamide from the neutral homogeneous aqueous solution by successive charges of new solvent or continuously by countercurrent flow in a known type of liquid-liquid extraction column, or in a series of mixer-settlers.

The temperature at which the extraction is carried out is not of prime importance. Generally, the extraction will be carried out at a temperature near the neutralization temperature, that is 0–60° C. It has been observed that increase in temperature causes a slight change of the separation coefficient at the expense of tne organic phase without materially adversely affecting the process. It is advantageous to operate at a temperature above room temperature, at 50 to 60° C. for instance, when the obtained acrylamide is desired in the crystallized form. In this case, it is effectively sufficient, after the extraction, to cool the hot solution of acrylamide in the solvent to a temperature sufficiently low to crystallize out a portion of the acrylamide. The mother solution, freed from crystals but saturated in acrylamide at the crystallization temperature, may be concentrated by distillation so as to precipitate a supplementary quantity of acrylamide or may be merely and simply recycled to the extraction stage. It is also possible to immediately concentrate the acrylamide solution coming from the extraction receptacle to obtain a first larger deposit of crystals.

The most general use of acrylamide consists in polymerizing it in solution.

The process of the present invention permits the direct use of the solution of acrylamide in the extracting solvent if the polymerization is to be done in a non-aqueous medium; this is an important advantage of the process.

But it is also possible to perform the polymerization in aqueous solution. Such a solution may be obtained by redissolving the acrylamide crystals obtained from the supersaturated organic solutions hereabove described but it is easier, especially when operating continuously, to use another important advantage of the invention. In fact, it suffices to wash the solution of acrylamide in the organic solvent with pure water. Because of its high solubility in water, the acrylamide is converted again into aqueous solution. The amount of water to be utilized depends essentially upon the desired concentration of acrylamide; it will be determined in order to obtain a solution containing 10–20% acrylamide by weight, for instance. This solution, which is practically free from mineral salts, may be used without any other treatment for the polymerization.

Reference is now made to the drawing which illustrates a continuous method of extraction.

An aqueous, homogeneous, neutral solution of acrylamide and alkali sulphate resulting from the complete neutralization by an alkaline material of the reaction product obtained by reacting acrylonitrile and concentrated sulphuric acid is introduced through a pipe 1 into the upper part of an extraction column 2 and flows downwardly therein. Simultaneously, the extraction solvent is introduced through a pipe 3 into the lower part of the column 2 and flows upwardly therein. An aqueous solution of alkaline sulphate, freed from acrylamide, is drawn off from the bottom of the column through a pipe 4. The solution of acrylamide dissolved in the solvent is drawn off from the top of the column through a pipe 5, which solution may be treated in various ways as follows:

(a) It is drawn off from the pipe 5 through the pipe 6 and used directly for the polymerization of acrylamide.

(b) It is incidentally concentrated in an evaporator 7 and then cooled in a cooler 8 so as to crystallize out acrylamide which is withdrawn as indicated by the reference numeral 9 from the mother solution which is then recycled through pipe 10 and pipe 3 to the extraction column 2.

(c) It is introduced through pipe 11 into the lower part of a second extraction column 12 into which pure water is fed at its top through a pipe 13. The water dissolves the acrylamide and an aqueous solution of acrylamide is drawn off from the bottom of the column 12 through pipe 14. The acrylamide in this aqueous solution can be polymerized directly while it is in this solution. The solvent, from which acrylamide has been removed by the water introduced through pipe 13, is withdrawn from the top of the column 12 and is fed through pipe 15 to a pipe 16 and pipe 3 which leads to the column 2.

To sum up, the advantages of the process according to the invention are as follows:

The neutralization of the free acidity in the medium formed by sulphuric acid hydrolysis of acrylonitrile, performed under the indicated conditions, results in a homogeneous solution. Accordingly, one is not bothered by a slurry of fine crystals of alkali or ammonia sulphates.

This necessary neutralization is easily accomplished due to the dilution of the reagents and the clearness of the solutions. Thus, the risk of secondary reactions prejudicial to the desired product is avoided. The evolved heat is easily dissipated.

The obtained acrylamide is very pure, either when crystallized or when in solution in the solvent or in water.

In consequence, the monomer may be polymerized under unusually cheap conditions.

The invention is illustrated further by the following non-limiting examples.

*Example 1*

440 g. of a homogeneous, aqueous solution having a pH of about 7 and containing 71 g. of acrylamide (1 mol) and 132 g. of neutral ammonium sulphate were agitated with 200 g. of methylethylketone at about 20° C. After allowing the mixture to settle, a light layer (solution of acrylamide in methylethylketone) was decanted. This light layer weighed 308 g. and contained 21.2% by weight of acrylamide. This layer also contained 15% by weight of water and only 0.04% of ammonium sulphate. Thus, 93% of the acrylamide present in the initial solution was extracted.

This trial carried out again at a temperature of 50° C. gave analogous results: 87% of the acrylamide was extracted.

Example 2

A mixture of 53 g. of acrylonitrile and 188 g. of sulphuric acid having a concentration of 78% was kept at 90° C. for 35 to 45 minutes so as to transform the greatest part of the acrylonitrile into acrylamide. After an addition of 24 g. of water, the solution was exactly neutralized up to a pH of approximately 7 by the addition of 248 g. of an aqueous ammonia solution having a concentration of 20% $NH_3$ by weight. Then the homogeneous, neutral, aqueous solution was agitated with 370 g. of methylisobutylketone at 20° C. After settling and decanting, a solution of acrylamide in methylisobutylketone was collected. The solution weighed 430 g. and contained 10.5% by weight of acrylamide. Consequently, 45 g. of acrylamide were extracted, which corresponds to a yield of 63.5% of the initial acrylonitrile. The residual aqueous phase was extracted again with 370 g. of methylisobutylketone and there was obtained an extract containing 3.7% acrylamide and weighing 392 g. which brought the yield in acrylamide to 84% of the initial acrylonitrile.

Example 3

The product from the reaction between 53 g. of acrylonitrile (1 mol) and 116 g. of sulphuric acid having a concentration of 84.5% (1 mol), wherein 96.7% of the initial acrylonitrile was present as acrylamide, was neutralized by adding 232 g. of an aqueous ammonia solution containing 15% by weight of $NH_3$, which brought the pH of the solution to 8. A homogeneous solution was obtained and agitated with 280 g. of methylisobutylketone at 40° C. After settling and decanting, a light layer weighing 346 g. and containing 53.2 g. of acrylamide and 13.8 g. of water was obtained. In consequence, 77.5% of the total amount of acrylamide was extracted. After concentrating this solution and cooling it, acrylamide crystals having a purity of 99% were obtained.

Example 4

The same initial reaction mixture as in Example 3 was neutralized up to a pH of 6.5 by adding 424 g. of an aqueous caustic soda solution having a concentration of 19% by weight of NaOH. The temperature was kept at 45° C. so as to maintain the solution homogeneous and 400 g. of methylisobutylketone were added. After agitating, the mixture was allowed to settle, the temperature being kept at 40° C. A light layer weighing 443 g. (solution of acrylamide in methylisobutylketone) was decanted. This layer contained 7.6% by weight of acrylamide. Therefore, 49.5% of the acrylamide present in the initial mixture was extracted.

Example 5

A liquid-liquid extraction device formed of a column 1 m. in height and 35 mm. in diameter filled with glass rings was fed continuously near its top with aqueous solution neutralized to a pH between 6 and 7 and containing 11.7% acrylamide and 24% ammonia sulphate at the rate of 1.1 kg./hr. and near its bottom with methylisobutylketone at the rate of 0.96 kg./hr. From the top of the column, there were extracted 1.11 kg./hr. of a solution containing 10.7% by weight of acrylamide in methylisobutylketone and, from the bottom of said column, 0.95 kg./hr. of an aqueous ammonium sulphate solution containing only 0.96% of acrylamide. The yield of acrylamide was 93%.

The solution of acrylamide in methylisobutylketone was introduced into the lower part of another extraction column while 0.435 kg./hr. of water was introduced into its upper part. On the one hand, 0.945 kg./hr. of methylisobutylketone saturated with water but practically freed from acrylamide and, on the other hand, 0.595 kg./hr. of an aqueous solution containing 19.5% by weight of acrylamide and containing less than 0.02% ammonia sulphate were continuously extracted.

The invention is not limited to the preferred embodiments but may be otherwise embodied or practiced within the scope of the following claims.

I claim:

1. A process of extracting acrylamide from an aqueous sulphuric acid solution resulting from the hydrolysis of acrylonitrile in an aqueous sulphuric acid medium, which comprises neutralizing said aqueous sulphuric acid solution with a reagent resulting in a sulphate which is soluble in water to produce an aqueous, homogeneous solution free from precipitates, treating said homogeneous solution with an organic solvent for acrylamide to extract acrylamide from the solution, said organic solvent being substantially insoluble in water and in aqueous alkaline and ammonium sulphate solutions, and recovering the solvent containing acrylamide dissolved therein.

2. A process according to claim 1, wherein said neutralized, homogeneous solution has a pH between 3 and 8.

3. A process according to claim 1, wherein said neutralized, homogeneous solution has a pH of about 7.

4. A process according to claim 1, wherein said organic solvent is characterized by the fact that it absorbs from 0.5 to 20% by weight of water when the solvent and water are in contact and are mutually saturated.

5. A process according to claim 1, wherein said organic solvent is selected from the class consisting of methylethylketone, methylisobutylketone, n-butanol and ethyl acetate.

6. A process according to claim 1, wherein said organic solvent is methylisobutylketone.

References Cited in the file of this patent

UNITED STATES PATENTS

| | | |
|---|---|---|
| 2,690,454 | Strain et al. | Sept. 28, 1954 |
| 2,771,490 | Stoddard et al. | Aug. 3, 1955 |
| 2,834,820 | Bloch | May 13, 1958 |
| 2,855,294 | Triblat | Oct. 7, 1958 |
| 2,866,781 | Chase et al. | Dec. 30, 1958 |

FOREIGN PATENTS

| | | |
|---|---|---|
| 533,346 | Canada | Nov. 20, 1956 |

OTHER REFERENCES

Elgin: "Industrial and Engineering Chemistry," vol. 41, No. 1, pages 35–38 (1949).